United States Patent
Willinger

[15] 3,670,758
[45] June 20, 1972

[54] PRIMING DEVICE FOR A SIPHON

[72] Inventor: Allan H. Willinger, New Rochelle, N.Y.

[73] Assignee: Metaframe Corporation, Maywood, N.J.

[22] Filed: March 30, 1970

[21] Appl. No.: 23,930

[52] U.S. Cl. .................................................................. 137/150
[51] Int. Cl. ......................................................... F04f 10/00
[58] Field of Search .......................... 137/150, 147; 210/169; 285/374

[56] References Cited

UNITED STATES PATENTS

| 232,525 | 9/1880 | Manwaring | 137/150 |
| 1,195,864 | 8/1916 | Starr | 137/150 X |
| 3,013,575 | 12/1961 | Persson | 137/150 |
| 1,941,859 | 1/1934 | Hall | 137/150 |
| 1,336,310 | 4/1920 | Marhenke | 137/147 |
| 2,956,507 | 10/1960 | Hutchinson | 210/169 UX |
| 361,691 | 4/1887 | Goodrich | 137/147 X |
| 3,466,383 | 9/1969 | Decker | 285/374 X |

FOREIGN PATENTS OR APPLICATIONS

| 871,578 | 1/1942 | France | 137/150 |

Primary Examiner—Henry T. Klinksiek
Attorney—Friedman & Goodman

[57] ABSTRACT

A priming device having tube adapted for attachment to a siphon which transfers a liquid from a receptacle. A hollow, squeezible, bulb-like member extends outwardly from the tube with the space within the bulb-like member communicating with the space within the tube. The discharge end of the tube has a one-way valve which permits air to escape therefrom, but prohibits air from entering the tube through the discharge end. Squeezing the bulb-like member starts a siphoning action.

8 Claims, 3 Drawing Figures

PATENTED JUN 20 1972
3,670,758
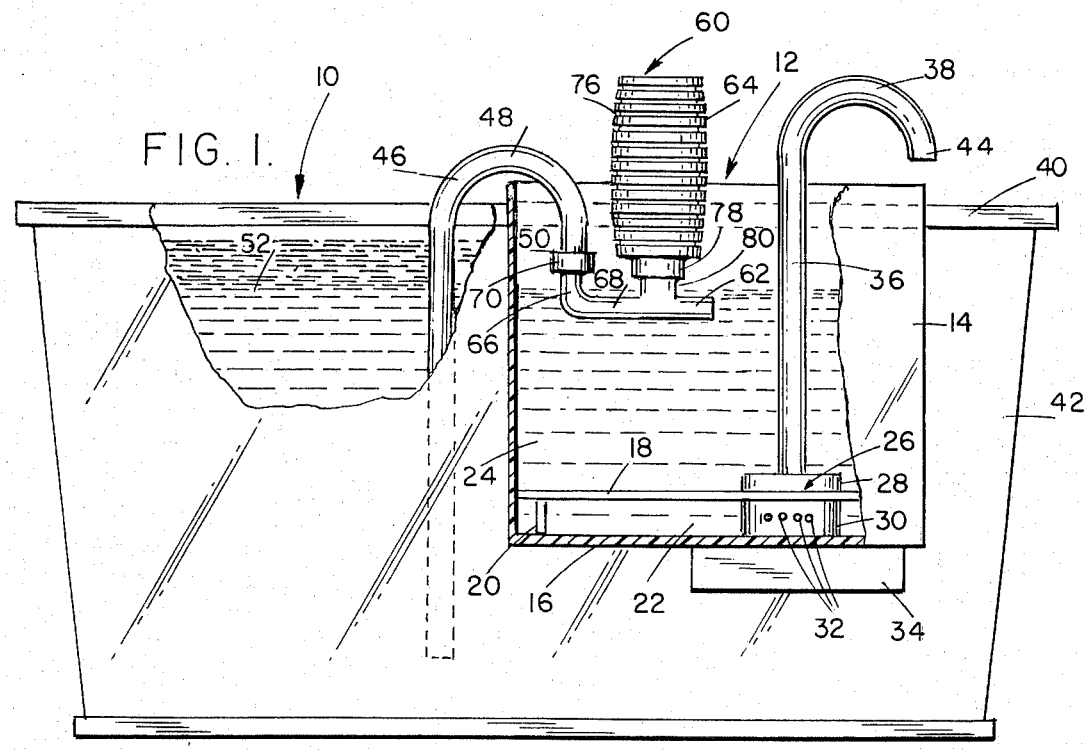
FIG. 1.
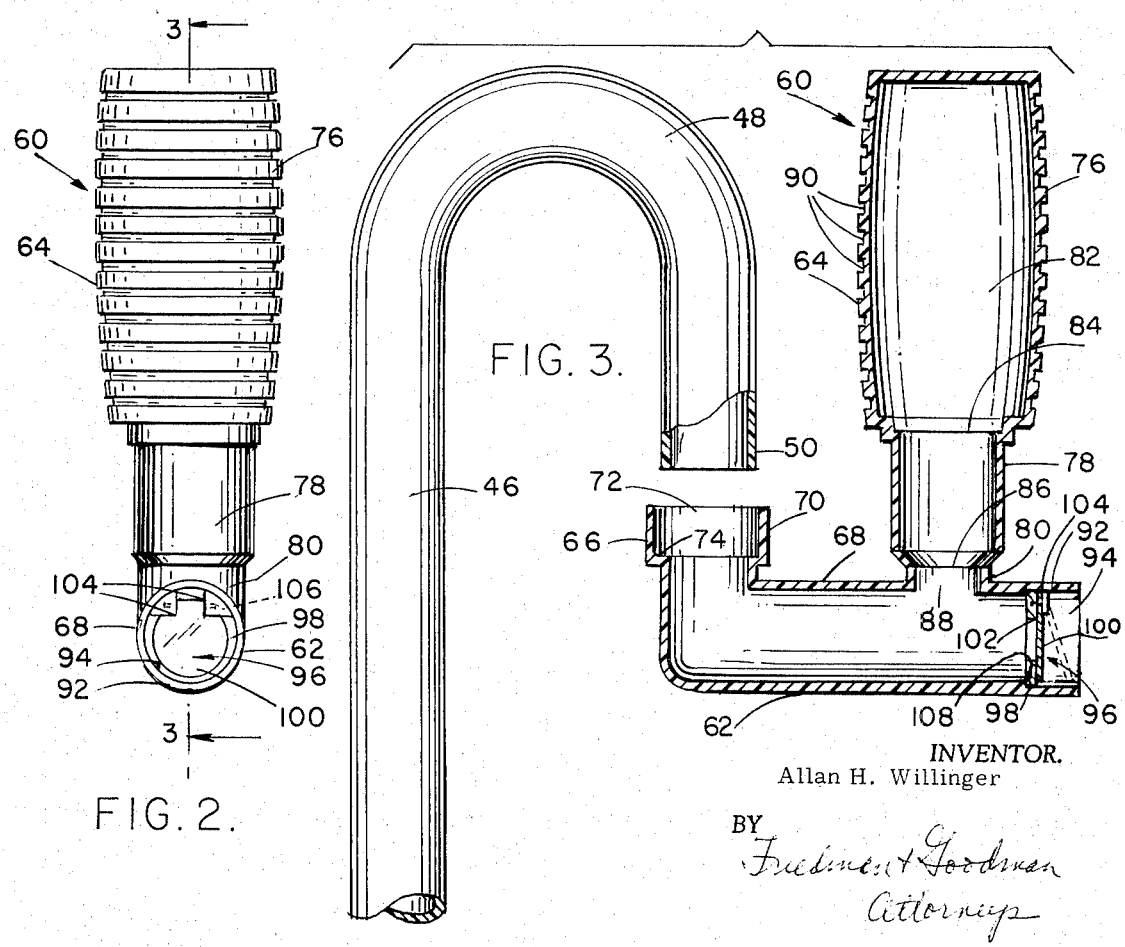
FIG. 2.
FIG. 3.
INVENTOR.
Allan H. Willinger
BY
Friedman & Goodman
Attorneys

PRIMING DEVICE FOR A SIPHON

BACKGROUND OF THE INVENTION

Siphoning devices are well known, particularly those using a siphon tube, as disclosed in U.S. Pat. No. 3,321,081, granted May 23, 1967, to Willinger. Willinger uses the siphon to provide a continuous flow of aquarium water from an aquarium tank to a filter tank. Siphons present the problem of how they are to be started.

The most common method of starting a siphon is to first fill the siphon with a liquid. Then, while holding the liquid within the siphon, submerge one end of the siphon in the liquid to be transferred. Upon release of the liquid within the siphon, the siphoning will start.

Siphoning devices using a bulb to start the siphon into operation are also well known in the art. However, the prior art devices using a bulb, needed a bulb with sufficient internal capacity so that one squeeze of the bulb would have to evacuate all of the air in the siphon so as to lift the water from the first container with one squeeze. If that failed, it would be required to lift the whole siphon tube and bulb out of the aquarium and replace it in position and start over.

SUMMARY OF THE INVENTION

This invention relates to a priming device that can be easily attached to a siphon to start the siphoning action by air pressure. One end of a tube-like member of the device is removably attached to the discharge end of the siphon. A squeezible bulb-like member extends from the tube-like member. Squeezing the bulb-like member forces air from the device through the discharge end of the tube-like member. Whereupon, release of the bulb-like member causes the air pressure outside the device to force the liquid, in which the siphon is placed, up the siphon to start the siphoning action. The device is provided with means to permit air to escape therefrom through the discharge end of the tube-like member, but prohibits the air outside the device from entering through the same.

An object of the present invention is to provide an improved priming device for a siphon which overcomes the disadvantages of the prior art siphoning devices.

Another object of this invention is to provide a priming device for a siphoning which can be easily attached to and removed from a siphon.

A further object of this invention is to provide a priming device for a siphon tube wherein the bulb member can have a much smaller internal area than the area of air to be evacuated and replaced with water in the siphoning tube.

A still further object of this invention is to provide a priming device for a siphon which permits the siphon to be primed without one's person coming in contact with the liquid being transferred.

An added object of this invention is to provide a priming device for a siphon which is extremely simple, being highly efficient in operation and having a relatively long trouble-free life, whereby the priming device can be readily produced and maintained with relatively little expense.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail so as to enable those skilled in the art readily to understand the function, operation, construction and advantages of it, when read in conjunction with the accompanying drawings, in which:

FIG. 1 represents a fragmentary, partly sectional side elevational view of an aquarium tank provided with a filtration device, showing an improved priming device for a siphon pursuant to the present invention;

FIG. 2 represents a side elevational view of the priming device of this invention; and FIG. 3 represents a sectional view, taken on the line 3—3 of FIG. 2, showing the priming device of this invention and a siphon tube.

DESCRIPTION OF THE PREFERRED EMBODIMENT

Referring to the drawings, FIG. 1 illustrates a conventional aquarium tank 10 which is provided with a filtration device 12. The filtration device 12 is of the external type and, as here shown, comprises a filter receptacle 14 which is suspended on an outer surface of the aquarium tank 10, in a conventional manner. The filter receptacle 14 is essentially rectangular in conformation and is provided with a bottom wall 16 on which there is mounted a platform 18.

The platform 18 is provided with a plurality of perforations or slots (not shown) and is provided at several locations thereof with a leg 20. The platform 18 serves to define a pair of chambers within the filter receptacle, a clean liquid chamber 22 below the platform 18 and a filter chamber 24 above the platform 18 which is provided with conventional filter material. The platform 18 mounts a centrifugal pump 26.

The pump 26 comprises an upper housing member 28 and a cooperating lower member 30. The lower member 30 is provided with a plurality of apertures 32 which define ports or passages through the housing member 30. The movable parts of the pump 26, comprising an impeller and a rotor, are not shown. In order to operate the pump 26, provision is made for an electric motor (not shown) mounted within a motor housing 34. The motor housing 34 is mounted on the bottom wall 16 of the filter receptacle 14.

A clean liquid return tube 36 is secured to the upper housing member 28 of the pump 26. The tube 36 is provided with a bend 38 at its upper end, which extends over a rim 40 on an upper marginal edge of a wall 42 of the aquarium tank 10, so that the outlet end 44 of the tube 36 overlies the interior of the aquarium tank 10.

The aquarium tank 10 is provided also with a conventional siphon tube 46. At its upper end, the siphon 46 is provided with a bend 48 which extends over the rim 40 of the wall 42 of the aquarium tank 10 so that the discharge end 50 of the siphon 46 extends into the filter receptacle 14.

In order to operate the above system, the siphon 46 is started and the liquid 52 is allowed to flow from the aquarium tank 10 into the siphon 46, and through the siphon 46 into the filter receptacle 14 where it will reach the level of the liquid 52 in the aquarium tank 10. The motor is energized to start the centrifugal pump 26, whereby the centrifugal pump action causes the liquid 52 in the chamber 22 below the platform 18 to be drawn through the openings 32 into the lower member 30 of the pump 26. The liquid 52 will then flow into the upper member 28 of pump 26, where the pump action then forces the liquid 52 up the tube 36, whereby the liquid 52 is then discharged into the aquarium tank 10. As the liquid 52 is drawn from chamber 22, additional liquid 52 from the chamber 24 continues to filter through the filter material therein and pass through the apertures in the platform 18 to provide a continuous supply of clean liquid into the chamber 22. The constant flow of liquid from the chamber 22 back into the aquarium tank 10 by means of the tube 36 tends to lower the level of the liquid 52 in the filter receptacle 14 relative to the level of the liquid 52 in the aquarium tank 10. This results in a siphon action through the siphon 46 so as to provide a continuous flow of aquarium liquid 52 from the aquarium tank 10 back into the filter receptacle 14 for the filtration and then the return of the liquid 52 back into the aquarium tank 10. The liquid 52 is usually water.

The above aquarium filter structure is set forth in the above-mentioned U.S. Pat. No. 3,321,081, which may be referred to for a more detailed description thereof. The present invention will now be set forth in detail, hereinbelow.

As shown above, in order to operate the aquarium filter system, the siphoning action must first be started. FIG. 1 illustrates a priming device for a siphon according to the present invention which is generally indicated by the reference numeral 60. The priming device 60 includes a tube 62 and a bulb-like member 64.

The tube 62 is L-shaped having a short leg member 66 and a long leg member 68. The free end of the leg member 66 is provided with an enlarged portion 70 having an opening 72 and an annular abutment 74 therein spaced from the opening 72. The enlarged portion 70 receives the discharge end 50 of the siphon 40.

The discharge end 50 is inserted into the opening 72 and then the siphon 46 is forced inwardly into the leg member 66 until the discharge end 50 contacts the abutment 74, whereby the siphon 46 can be inserted no further. The opening 72 is very slightly smaller than the discharge end 50 of the siphon 46 so that an air-tight friction fit is formed between the siphon 46 and the enlarged portion 70 of the tube 62. However, it is understood that tube 62 may still be removed from the siphon 46, when desired, whereby a large force is not required to separate the tube 62 from the siphon 46.

The bulb-like member 64 extends outwardly from the body of the leg member 68. As shown, the bulb-like member 64 and the leg member 66 extend outwardly in the same direction, both being perpendicular to the leg member 68. However, if desired, the bulb-like member 64 and the leg member 66 may extend in different directions from each other, whereby either member may be disposed in any selected angle, including the preferred right angle, with respect to the leg member 68.

The bulb-like member 64, shown best in FIG. 2 and 3, includes a large body portion 76 and two stepped, smaller portions 78, 80. The body portion 76 defines a chamber 82 which communicates with the leg member 68 through opening 84 between the body portion 76 and the intermediate portion 78, through opening 86 between the intermediate portion 78 and the lower portion 80, and through opening 88 between the lower portion 80 and the leg member 68. The portions 78, 80 function to space the body portion 76 from the leg member 68 so that the body portion 76 may be squeezed easily, however if desired, the portions 78, 80 may be eliminated, whereby the body portion 76 would be directly connected to the leg member 68.

The priming device 60 is preferably formed, as by molding or otherwise, from a suitable plastic. The priming device 60 is preferably molded in one piece, whereby the material used is flexible so that the body portion 76 of the bulb-like member 64 is squeezible, and also so that the portion 70 of leg member 66 may be easily forced over the discharge end 50 of the siphon 46. The body portion 76 is provided with annular grooves 90 to reduce the cross-section of the body portion 76 so that the body portion 76 may be easily squeezed.

The leg member 68 of the tube 62 is provided with a discharge end 92 including an opening 94. The opening 94 is slightly enlarged to form an annular abutment 108 which seats a one-way valve 96. The valve 96 includes a body member 98 and a thin pivotable member 100. The body member 98 is provided with an opening 102 and two projecting portions 104. The member 100 is provided with a narrow portion having two pin-like elements 106 extending therefrom. The narrow portion is positioned between the projecting portions 104. Each projecting portion 104 is provided with an aperture to receive one of the elements 106 to pivotally connect the member 100 to the body member 98 whereby the member 100 normally covers the opening 102 in the body member 98.

The body member 98 is secured within the discharge end 92 of the tube 62 against the annular abutment 108 formed therein, using a friction fit or other suitable means to form an air-tight seal therebetween, so that air can only pass through the opening 102. As shown in FIGS. 2 and 3, the member 100 pivots outwardly from the discharge end 92 to uncover the opening 102 so that air or liquid can only pass from the discharge end 92 of the tube 62, where no air or liquid can enter the tube 62 through the opening 102.

In operation, the discharge end 50 of the siphon 46 is secured within the inlet opening 72 of the enlarged portion 70 of the leg member 68, as stated above. The operator holds the U-shaped portion 48 of the siphon 46 with one hand so that the free inlet end of the siphon 46 is submerged in the liquid 52 within the tank 10, and the priming device 60 is suspended in the receptacle 14. The operator rapidly squeezes the body portion 76 of the bulb-like member 64 with his other hand.

On the first squeeze, the air in the chamber 82 is forced into the leg member 68 of the tube 62, the air moving simultaneously toward the openings 72 and 94 of the tube 62. Some of the air forces the member 100 of the valve 96 to pivot to uncover the opening 102 so that some of the air escapes to the atmosphere outside the priming device 60. When the bulb-like member is released, the body portion 76 again fills up with air, the air being drawn or supplied from the quantity of air contained within the tube 62 and the siphon 46, whereby the member 100 is in the closed position and doesn't permit any air from the outside to enter the tube 62 through the opening 102.

As the air is drawn from the siphon 46 into the tube 62, the atmospheric pressure acting on the liquid 52 in the tank 10 forces the liquid 52 up into the inlet leg of the siphon 46 to fill the space thus formed. As the operator continues to squeeze the bulb-like member 64, the above action is repeated to force more air from the priming device 60 into the atmosphere, so that the liquid 52 in the inlet leg of the siphon 46 continuously rises as the liquid 52 replaces the escaping air. Once the liquid 52 is forced into the upper part of the U-shaped portion 48 of the siphon 46, the liquid 52 will tend to move downwardly in the other leg of the siphon 46 toward the discharge end 50 at a faster rate into the air space therebelow, whereby the momentum of the liquid 52 moving through the siphon 46 will start the siphoning action. The liquid 52 will then flow through the tube 62, where the liquid 52 will pivot the member 100 to the opened position so that the liquid flows through the opening 102 into the discharge end 92, and then flows out of the opening 94 into the receptacle 14.

Once the siphoning action has started, the priming device may be removed by pressing downwardly on the bulb-like member 64 to disconnect the enlarged portion 70 of the tube 62 from the discharge end 50 of the siphon 46. The aquarium filter system will now function as stated above. It is contemplated that the enlarged portion 70 of the priming device 60 may be adaptable to fit most siphon tubes enhancing its applicability and utilization. Obviously, the priming device 60 may be used with many types of liquids, especially water.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. A priming device for initiating siphoning from a first water-containing receptacle to a second water-receiving receptacle through an intermediary of a tubular member having opposite first and second open ends respectively, the first end being submerged in the water of the first water-containing receptacle and the second end extending into the second water-receiving receptacle, said priming device comprising a conduit, said conduit including a pair of open-ended portions, squeezible hollow deformable means communicating with said conduit intermediate said open-ended portions for evacuating air present in said conduit, one of said open-ended portions of said conduit defining a discharge end and including valve means for preventing air expelled therefrom by action of said deformable means from reentering therein, said valve means including first and second valve members disposed within said discharge end with said second valve member being positioned between said first valve member and the discharge end opening, said first valve member being provided with a valve opening smaller than said discharge end opening, said second valve member coacting with said first valve member to define closed and opened positions of said valve means, said second valve member covering said valve opening in said closed position with said second valve member being moved away from said valve opening in said opened position, the other of said open-ended portions of said conduit including coupling means for connecting said conduit to the second end of the tubular member which extends into the second water-receiving receptacle, said coupling means permitting generally rotation-free slip-off detachment of said priming device from the second end of the tubular member upon initiation of continuous siphoning such that the second end of the tubular member remains in the second water-receiving receptacle and siphoning continues, said coupling means including an open portion for receiving the second end of the tubular member in a press-fit relation.

2. A priming device as claimed in claim 1 wherein said open portion of said coupling means is enlarged for receiving the second end of the tubular member.

3. A priming device as claimed in claim 1 wherein said conduit includes an open intermediate portion and said hollow deformable means includes a bulb-like member having an open end communicating with said open intermediate portion of said conduit.

4. A priming device as claimed in claim 3 wherein said conduit is generally L-shaped and includes mutually perpendicular portions, one of the latter said portions being of greater extent than the other, the portion of greater extent terminating in said discharge open-ended portion and including said open intermediate portion to which is connected said bulb-like member, the portion of lesser extent including said coupling means.

5. A priming device as claimed in claim 4 wherein said portion of lesser extent and said bulb-like member extend generally parallel to one another thereby exposing said bulb-like member for manipulation and permitting downward withdrawal of said portion of lesser extent from the second open end of said tubular member.

6. A priming device according to claim 3, wherein said bulb-like member is provided with groove means to permit said bulb-like member to be easily squeezed.

7. A priming device according to claim 6, wherein said groove means includes annular grooves provided on an outer surface of said bulb-like member.

8. A priming device according to claim 6, wherein said bulb-like member is formed from a flexible plastic material.

* * * * *